March 22, 1966  E. A. ROESKE ETAL  3,241,317
HYDROSTATIC TRANSMISSION SERVO VALVE
Filed June 30, 1964  2 Sheets-Sheet 1
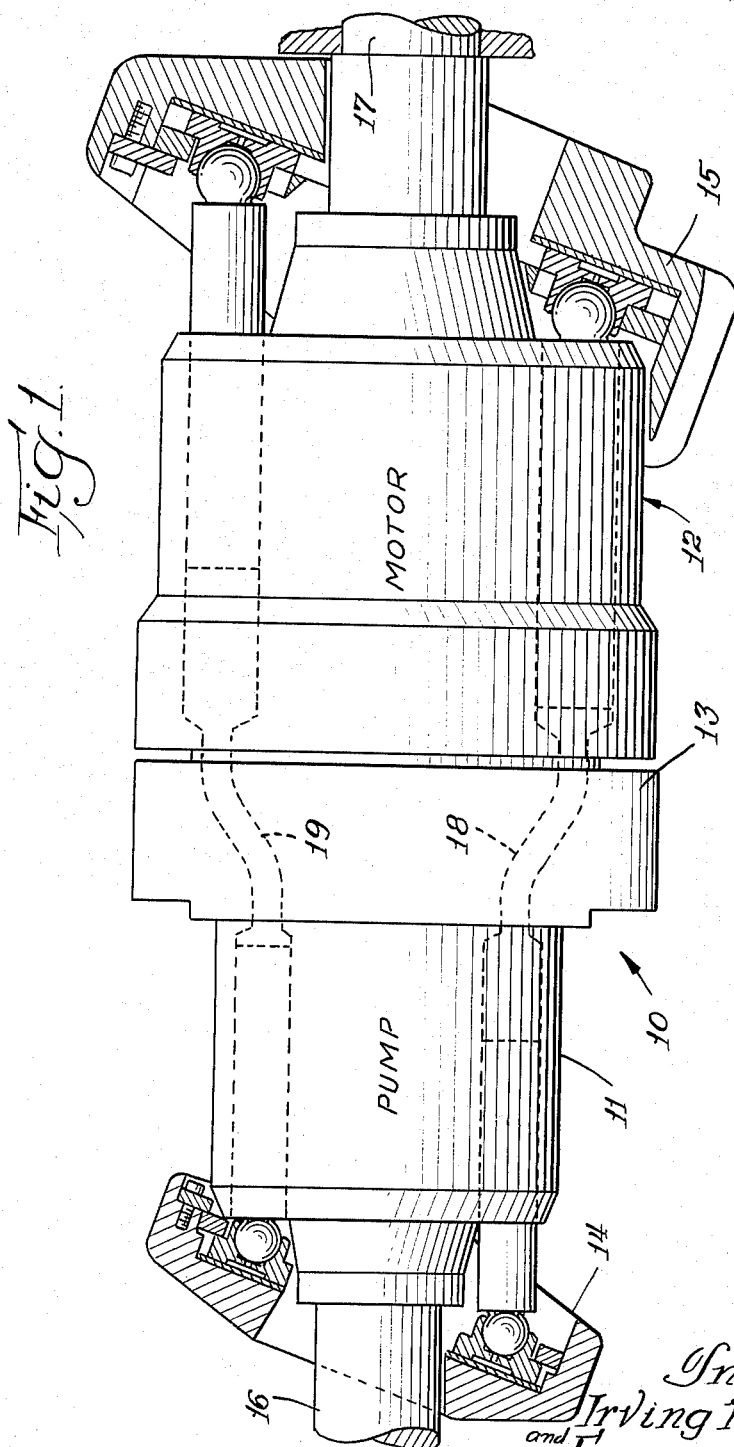
Inventors
Irving H. Hallberg
and Eugene A. Roeske
By Robert L. Zieg
Atty.

United States Patent Office 3,241,317
Patented Mar. 22, 1966

3,241,317
HYDROSTATIC TRANSMISSION SERVO VALVE
Eugene A. Roeske, St. Louis, Mo., and Irving H. Hallberg, Des Plaines, Ill., assignors to Borg-Warner Corporation, Chicago, Ill., a corporation of Illinois
Filed June 30, 1964, Ser. No. 379,254
10 Claims. (Cl. 60—53)

This invention relates to a servo mechanism for control of a hydrostatic transmission.

More particularly this invention relates to a servo mechanism to control the swash plate angle for the variable displacement fluid pump in a hydrostatic transmission. The swash plate angle is controlled by a manual lever and a servo valve is provided to move the swash plate.

The object of this invention is to provide a servo valve for controlling the swash plate of a fluid pump wherein the servo valve is so constructed that when the manual control lever is in the neutral position the high pressure side of the transmission will be connected to the low pressure side of the transmission to return any fluid pumped by the pump unit to the pump inlet. In this manner the precise neutral position of the manual lever at which the swash plate is at zero angle so that no fluid will be pumped need not be determined since for a small range of movement of the manual lever the servo valve returns any fluid pumped to the pump inlet thereby preventing creep of the vehicle in the neutral position.

The invention consists of the novel constructions, arrangements and devices to be hereinafter described and claimed for carrying out the above stated object and such other objects as will be apparent from the following description of preferred forms of the invention, illustrated with reference to the accompanying drawings in which:

FIGURE 1 is a side view of a hydrostatic transmission embodying the present invention showing the overall arrangement of the pump and motor units;

Figure 3:
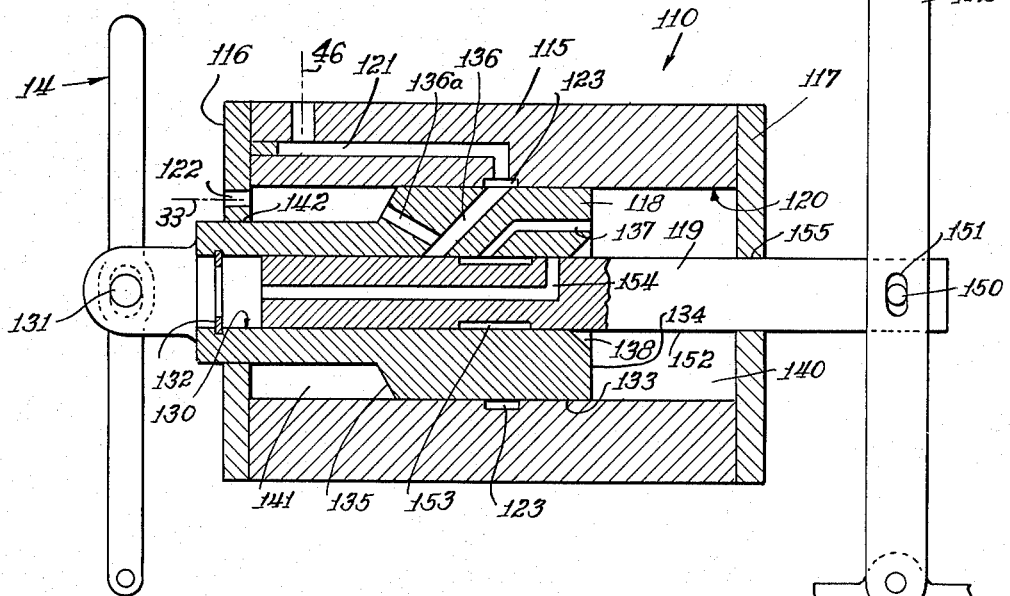
FIGURE 3 is a cross-sectional view of the servo valve of the hydraulic circuit.

The novel and improved servo valve of the present invention is designed to be used in the hydraulic control circuit for controlling the angle of the swash plate of the pump unit of a hydrostatic transmission of the type shown in FIGURE 1, having a fluid pump adapted to be driven by a prime mover and driving a fluid motor to provide an infinitely variable drive ratio.

A hydrostatic transmission 10 embodying the present invention is illustrated in FIGURE 1 and has a fluid pump 11 and a fluid motor 12. A stationary port plate 13 separates the fluid pump and motor. A variable angle swash plate 14 is provided for the pump and a fixed swash plate 15 is provided for the motor unit. The pump is driven by an input shaft 16 and the motor unit drives an output shaft 17. Fluid passages 18 and 19 in the stationary port plate 13 interconnect the pump and motor units. The transmission illustrated in FIGURE 1 is more particularly described in co-pending application S.N. 259,499, filed February 19, 1963, of common assignee and now U.S. Patent No. 3,143,858.

Figure 2:
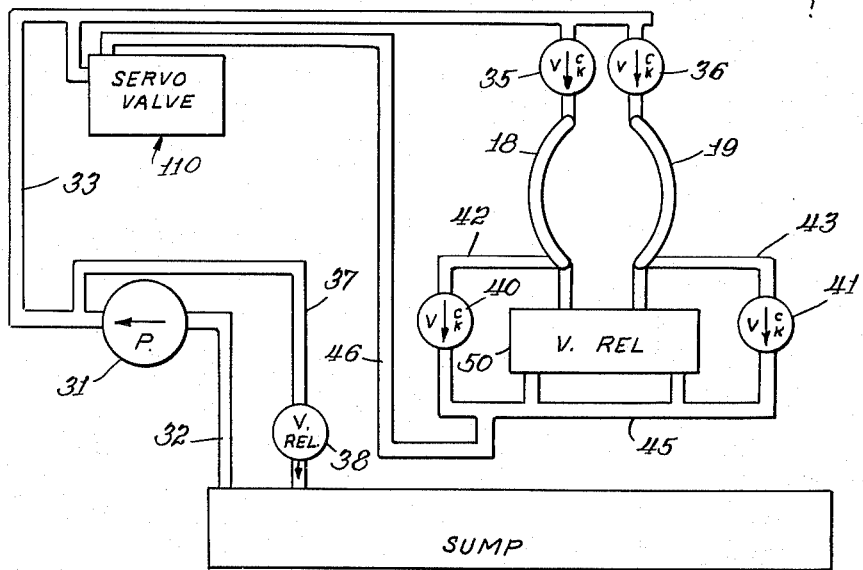
FIGURE 2 is a schematic diagram of the pressure supply and fluid control circuit for the transmission of FIGURE 1.

Referring to FIGURE 2 a fluid supply and swash plate control circuit is schematically illustrated. The fluid circuit including the pressure passages which interconnect the pump and motor units is more particularly illustrated in the mentioned co-pending application. The fluid circuit of FIGURE 2 includes a sump 30 and a fluid charge pump 31 which draws fluid from the sump through passage 32. Passage 33 interconnects the output side of the charge pump 31 with a servo valve 110 and with a pair of check valves 35 and 36 which are in communication with the passages 18 and 19 interconnecting the pump and motor units. Passage 33 is also in communication with a fluid passage 37 leading to a relief valve 38 which will control the pressure in the passage 33 and return a portion of the fluid from the charge pump to the sump. The fluid passages 18 and 19 interconnecting the pump and motor units are in communication with a pair of check valves 40 and 41 through passages 42 and 43 respectively.

One or the other of the fluid passages 18 and 19 will be the high pressure passage depending on the direction of rotation of the pump and motor units. Whichever passage is the high pressure passage will determine which of the check valves 40 and 41 will open and admit high pressure fluid to a fluid passage 45; high pressure fluid in passage 45 will then close the other check valve. In this way the fluid passage 45 will always contain the high pressure fluid within the system. The pressure of the fluid in passage 45 is limited by a relief valve 50 which is in communication wth the fluid passages 18 and 19. A branch passage 46 interconnects the high pressure passage 45 with the servo valve 110. The relief valve controls or limits the pressure in passage 45 and whichever of the passages 18 or 19 is high pressure by interconnecting passages 18 and 19 when a predetermined maximum pressure is exceeded.

The fluid passage 33 which is connected to the servo valve 110 will always have a pressure the same as the pressure in whichever of the fluid passages 18 or 19 is the low pressure passage since whichever of the check valves 35 or 36 is in communication with the low passage will be open and a high pressure fluid in the other passage 18 or 19 will close the other check valve. The pressure in the passage 46 connected to servo valve 110 will always be the same as the pressure in the high pressure passage between the pump and motor units due to the action of the check valves 40 and 41.

Referring to FIGURE 3, the servo valve 110 of the present invention is illustrated. A maual control lever 112 is provided which is movable to adjust the angle of the variable angle swash plate 14. The swash plate 14 and manual lever 112 are schematically illustrated in FIGURE 3.

The servo valve 110 comprises a valve body 115 having end caps 116 and 117 fixed thereto in a known manner for example by bolts (not illustrated). A piston 118 and pilot valve 119 are contained within the valve body 115.

The valve body 115 has a bore 120 extending longitudinally therethrough. The piston 118 is slidable within the bore 120. A fluid passage 121 is provided in the valve body 115 which is adapted to be connected to the fluid passage 46. A fluid passage 122 is provided in the end cap 116 which is adapted to be connected to the fluid passage 33 between the pump and motor units. The fluid passage 121 is in communication with a groove 123 formed in the bore 120. The piston 118 has a bore 130 extending axially therethrough within which the pilot valve 119 is slidably mounted. The piston 118 is connected to the swash plate through a pin 131 and will change the angle of the swash plate 14 as it moves within the bore 120 of the valve body 115.

A snap ring 132 is mounted within the bore 130 in the piston 118 which limits the movement of the pilot valve to the left as shown in FIGURE 1 with respect to the piston 118. The piston 118 includes an outer circumferential surface 133, a radially extending end surface 134 and an angular surface 135 which is substantially radially extending.

A fluid passage 136 is provided in the piston 118 which interconnects the surface 133 and the bore 130 in the piston. A fluid passage 136a interconnects surface 135 and passage 136. A second fluid passage 137 is provided in the piston 118 which connects the radially extending surface 134 with the bore 130. The bore 130 has a chamfer 138 formed in the right-hand end of the bore as viewed in FIGURE 1.

The piston 118, valve body 115 and end cap 116 define a pressure chamber 141 on the left-hand side of the servo valve 110 as viewed in FIGURE 3. The end cap 116 has a bore 142 within which the piston 118 is slideably mounted.

The pilot valve 119 has a pin 150 extending therefrom engageable in a slot 151 in the manual lever 112 so that the pilot valve 119 is slidable longitudinally by the manual lever 112. The pilot valve 119 has an outer circumferential surface 152 and has a circumferential groove 153 formed in the surface 152. The pilot valve also has a fluid exhaust passage 154 which connects the circumferential surface 152 to the left-hand end of the pilot valve as viewed in FIGURE 3 and thereby to the sump 130 for the transmission. End cap 117 has a bore 155 therein within which the pilot valve 119 is slideably mounted.

The operation of the servo valve of the present invention is as follows: the fluid pressure passage 121 is connected to the high pressure conduit or pump output passage between the pump and motor units of the transmission by means of passages 46 and 45 and when the manual lever is in neutral position as illustrated in FIGURE 3, fluid passage 121 will be connected by means of passages 136 and 136a in the piston 118 to pressure chamber 141 and through passage 122 to the low pressure passage of the transmission by means of passage 33. Thus the improved and novel servo valve of the present invention will exhaust any fluid pumped when the manual lever is in the neutral position from the high pressure passage. In the embodiment illustrated the high pressure passage is connected to the pump inlet or low pressure passage of the transmission to prevent any creep condition from occurring since no fluid pressure will be conducted to the fluid motor. However, the servo valve could be constructed to exhaust pressure in the high pressure passage to the sump when the manual lever is in the neutral position.

The width of the groove 123 formed in bore 120 provides a certain range of movement of the manual lever and piston 118 with respect to the valve body 115 in which any fluid pumped will be connected to the pump inlet as described so that the exact zero pump angle of the swash plate 14 need not be found when the manual lever is in neutral position to prevent a creep condition. An approximate position of the manual lever 112 which will provide communication between fluid passage 136 and groove 123 in the valve body 115 will prevent a creep condition from occurring.

When the manual lever 112 is moved to the left to increase the swash plate angle in one direction from the neutral position the pilot valve 119 will be moved to the left and groove 153 of the pilot valve 119 will provide communication between passages 136 and 137. The pressure existing in pressure chamber 141 will thus be conducted to the pressure chamber 140 and will act on the surface 134 of the piston 118 to move the piston to the left. The piston 118 will move to the left following the movement of the pilot valve 119 until movement of the pilot valve 119 discontinues at which time the connection between the passage 136 and the groove 153 will be interrupted and no further pressure communicated to the pressure chamber 140.

The piston 118 will move to the left until the piston 118 partially uncovers the passage 154 in the pilot valve 119 which will put pressure chamber 140 in communication with the sump 30 through passage 154. The piston 118 will thus be positioned when an equilibrium point is reached at which the force acting on the left side of piston 118 due to the pressure in the chamber 141 times the area of surface 125 plus the resultant force of the swash plate on pin 131 equals the force due to pressure in chamber 140 times the area 134.

When the manual lever is moved to move the pilot valve 119 to the right as viewed in FIGURE 3, the passage 154 will be put in communication with the pressure chamber 140 exhausting any pressure existing in the pressure chamber 140. The force on the piston 118 due to pressure in the chamber 141 will then move the piston 118 to the right following movement of the manual lever 112 until the piston 118 again covers the passage 154 in the pilot valve 119.

From the above it will be apparent that an improved servo valve mechanism has been provided by means of which the swash plate of a hydrostatic transmission pump can be adjusted precisely and in which the movement of the manual lever to change the swash plate angle will be followed by a corresponding movement of the swash plate.

Further, the novel and improved servo valve of the present invention incorporates an effective and simple method of preventing a creep condition occurring when the manual lever is set in the neutral position. A small range of movement of the manual lever in the neutral position is provided in which the servo valve will connect the pump outlet or high pressure passage and the pump inlet or low presure passage to shunt any fluid pumped by the fluid pump back to the pump inlet preventing any high pressure fluid from reaching the fluid motor of the transmission preventing a creep condition.

It will also be apparent that the servo valve of the present invention can be used in other environments other than a hydrostatic transmission wherein a pump of the type illustrated is used as a pressure source.

It is to be understood that the foregoing description is merely illustrative of a preferred embodiment of the invention and that the scope of the invention is not to be limited thereto but is to be determined by the appended claims.

We claim:

1. A servo valve for a fluid pump having inlet and outlet passages and a variable angle swash plate including manual means connected to said servo valve, said servo valve including means connected to said swash plate, said manual means being operable to actuate said servo valve to vary the angle of said swash plate, and said manual means having a neutral position in which said servo valve is operative to connect the fluid pressure outlet passage of said pump to the inlet passage of the pump.

2. A servo valve for a fluid pump having inlet and outlet passages and a variable angle swash plate including manual means operable to actuate said servo valve to vary the angle of said swash plate, said servo valve including a piston connected to said swash plate and a pilot valve slidably mounted within said piston and connected to said manual means, said piston being adapted to follow movement of said pilot valve when moved by the manual means to adjust the angle of said swash plate, said manual means having a neutral position in which said servo valve will interconnect the fluid pressure outlet passage of said pump with the fluid pressure inlet passage of the pump.

3. A servo valve for a fluid pump having inlet and outlet passages and a variable angle swash plate comprising a piston operatively connected to said swash plate, a pilot valve slidably received in said piston, manual means operatively connected to said pilot valve, said manual means having a neutral position, said piston being adapted to follow movement of said pilot valve when said pilot valve is moved by said manual means to thereby change the angle of said swash plate and vary the pump capacity, means in said piston adapted to interconnect the fluid pressure outlet passage of said pump with the fluid pump inlet passage when said manual valve is in said neutral position.

4. In a hydrostatic transmission having a fluid pump and fluid motor and including high pressure and low pressure fluid passages interconnecting said pump and motor units, said pump having a variable angle swash plate, a servo valve to control said swash plate, manual means operatively connected to said servo valve, said servo valve including means connected to said swash plate, said manual means being operable to actuate said servo valve to vary the angle of said swash plate, and said manual means having a neutral position in which said servo valve interconnects the high and low pressure fluid passages between the pump and motor units.

5. In a hydrostatic transmission having a fluid pump and fluid motor with high and low pressure fluid passages interconnecting said pump and motor and including a variable angle swash plate for the fluid pump, a servo valve, said servo valve including a piston connected to said swash plate, manual means operable to actuate said servo valve to vary the angle of said swash plate, a pilot valve slidably mounted within said piston and connected to said manual means, said piston being adapted to follow movement of said pilot valve when moved by the manual means to adjust the angle of said swash plate, said manual means having a neutral position, means in said piston adapted to interconnect the high and low pressure fluid passages between said pump and motor units when the manual means is in said neutral position.

6. In a hydrostatic transmission including a fluid pump and a fluid motor having high and low pressure fluid passages interconnecting said pump and motor units and said pump having a variable angle swash plate, a servo valve operable to control the angle of said swash plate including a piston operatively connected to said swash plate, a pilot valve slidably received in said piston, manual means operatively connected to said pilot valve, said manual means having a neutral position, said piston being adapted to follow movement of said pilot valve when said pilot valve is moved by said manual means to thereby change the angle of said swash plate and vary the pump capacity, a fluid passage in said piston adapted to interconnect the high and low pressure fluid passages between the pump and motor units when said manual is in said neutral position.

7. In a hydrostatic transmission having a fluid pump and fluid motor including a variable angle swash plate for said pump and high and low pressure fluid passages interconnecting said pump and motor units, a servo valve operable to control the angle of said swash plate, said servo valve comprising a valve body, a piston slidably mounted within said valve body and connected to said swash plate, said piston having an axial bore therethrough, a pilot valve slidably mounted within said axial bore in said piston, a manually operable control member connected to said pilot valve, the piston being adapted to follow the axial movement of said pilot valve when moved by the manual member to change the angle of said swash plate, said manual means having a neutral position in which said swash plate will be at an angle of minimum pump capacity, fluid passage means in said valve body adapted to cooperate with fluid passage means in said piston when said piston is in a position corresponding to the neutral position of said manual means to thereby interconnect the high and low pressure fluid passages between said fluid pump and motor units and thereby prevent any fluid pressure from being communicated from the pump to the motor unit when the manual means is in the neutral position.

8. In a hydrostatic transmission having a fluid pump and fluid motor and including high pressure and low pressure fluid passages interconnecting said pump and motor units, said pump having a variable angle swash plate, a servo valve to control said swash plate, manual means operatively connected to said servo valve, said servo valve including means connected to said swash plate, said manual means being operable to actuate said servo valve to vary the angle of said swash plate, and said manual means having a neutral position in which said servo valve exhausts fluid pressure from said high pressure passage interconnecting said pump and motor units.

9. In a hydrostatic transmission including a fluid pump and a fluid motor having high and low pressure fluid passages interconnecting said pump and motor units and said pump having a variable angle swash plate, a servo valve operable to control the angle of said swash plate including a piston operatively connected to said swash plate, a pilot valve slidably received in said piston, manual means operatively connected to said pilot valve, said manual means having a neutral position, said piston being adapted to follow movement of said pilot valve when said pilot valve is moved by said manual means to thereby change the angle of said swash plate to vary the pump capacity and a fluid passage in said piston adapted to exhaust fluid pressure from said high pressure fluid passage between the pump and motor units when said manual valve is in said neutral position.

10. In a hydrostatic transmission having a fluid pump and fluid motor including a variable angle swash plate for said pump and high and low pressure fluid passage interconnecting said pump and motor units, a servo valve operable to control the angle of said swash plate, said servo valve comprising a valve body, a piston slidably mounted within said valve body and connected to said swash plate, said piston having an axial bore therethrough, a pilot valve slidably mounted within said axial bore in said piston, a manually operable control member connected to said pilot valve, said piston being adapted to follow axial movement of said pilot valve when moved by the manual member to change the angle of said swash plate, said manual means having a neutral position in which said swash plate will be at an angle of minimum capacity, fluid passage means in said piston, fluid passage means in said valve body adapted to cooperate with said fluid passage means in said piston when said piston is in a position corresponding to the neutral position of said manual means to thereby exhaust fluid pressure from said high pressure fluid passage between said fluid pump and motor units and thereby prevent any fluid pressure from being communicated from the pump to the motor unit when the manual means is in the neutral position.

References Cited by the Examiner

UNITED STATES PATENTS

| | | | |
|---|---|---|---|
| 2,214,817 | 9/1940 | Harrington | 60/52 |
| 2,265,314 | 12/1941 | Rose | 60—53 X |
| 2,381,795 | 8/1945 | Willett | 60—53 |
| 2,413,301 | 12/1946 | Ellis | 60—53 |
| 2,603,065 | 7/1952 | Sarto | 60—52 |

EDGAR W. GEOGHEGAN, *Primary Examiner.*